United States Patent [19]

Miller

[11] 3,776,394

[45] Dec. 4, 1973

[54] METHODS AND APPARATUS FOR IMPARTING A DESIRED ORIENTATION TO AN ARTICLE

[75] Inventor: Dennis Brian Miller, Ewing Twsp., Mercer County, N.J.

[73] Assignee: Western Electric Company, Incorporated, New York, N.Y.

[22] Filed: Aug. 23, 1972

[21] Appl. No.: 283,038

[52] U.S. Cl. ............ 214/1 R, 198/33 AC, 214/152, 302/2 R

[51] Int. Cl. ............ B65g 47/24

[58] Field of Search ............ 214/1 BE, 152, 1 Q, 214/1 C, 1 R; 193/43 D, 43 R; 198/33 R, 33 AC; 302/2 R

[56] References Cited

UNITED STATES PATENTS

| | | | |
|---|---|---|---|
| 3,341,030 | 9/1967 | Engels | 214/1 Q |
| 3,344,900 | 10/1967 | Drop | 198/33 R |
| 3,472,356 | 10/1969 | Reppert | 214/1 C X |
| 3,503,527 | 3/1970 | Devol | 214/1 Q |
| 3,559,819 | 2/1971 | Large | 214/1 C |

*Primary Examiner*—Gerald M. Forlenza
*Assistant Examiner*—Frank E. Werner
*Attorney*—W. M. Kain et al.

[57] ABSTRACT

A small, randomly oriented article, e.g., a beam lead device, is supported on an upper surface of a ram. The ram is relatively movable vertically within an aperture in a horizontal plate. The aperture has a lower portion of dimensions very slightly larger than those of an article, and is shaped such that the article will necessarily assume a desired orientation within the lower portion of the aperture. The aperture has an upper portion with walls tapered downwardly and inwardly in order to guide the article into an aligned position in the lower portion of the aperture as the article moves downwardly within the aperture. A fluid is introduced into the vicinity of the upper surface of the ram at approximately the same time as the ram begins a relative downward movement within the aperture. The fluid causes the article to float and/or interferes with any tendency of the article to adhere to the tapered walls of the aperture due to friction, static electricity and/or the presence of any adhesive material on the article. The fluid also tends to form a meniscus sloping downwardly away from the tapered walls toward the desired orientation of the article, thereby further urging the article into the desired orientation. Once the article is aligned correctly on the upper surface of the ram, a partial vacuum may be introduced beneath the article so as to withdraw the fluid and to retain the article on the ram, after which the ram may be raised for removal of the article.

18 Claims, 6 Drawing Figures

METHODS AND APPARATUS FOR IMPARTING A DESIRED ORIENTATION TO AN ARTICLE

BACKGROUND OF THE INVENTION

This invention relates to methods and apparatus for imparting a desired orientation to an article and, more particularly, to methods and apparatus for aligning very small, randomly oriented articles, such as beam lead devices, in a very precise manner.

In the art of manufacturing electronic equipment, it is often necessary to handle articles of exceedingly small dimensions. For example, it may be desired that beam lead devices approximately 0.070 inches square, with beam leads of approximately 0.007 inch length and 0.004 inch width, be bonded to ceramic substrates. In order that each of a number of beam leads of a device may be bonded securely to an associated land area on a substrate, a precision alignment is necessary between the beam lead device and a receiving position on the substrate. Since the substrate is ordinarily quite large with respect to the beam lead device and is regularly shaped, the major difficulty in device-substrate alignment involves the fixing of the beam lead device precisely in a desired orientation.

Two basic types of article alignment systems are known: electronic systems and mechanical systems. Commercially available electronic alignment systems perform aligning operations quite adequately, but are generally complex and expensive. Mechanical alignment systems are prone to be inadequate in operation due to the tendency of articles undergoing alignment to adhere to apparatus surfaces.

Since neither type of system presently available is both inexpensive and reliable, a clear need is evident for a precision article alignment system incorporating the relative economy and simplicity of the mechanical alignment without any sacrifice in reliability due to the tendency toward adherence of the articles to apparatus surfaces.

SUMMARY OF THE INVENTION

An object of the invention resides in the provision of new and improved methods and apparatus for imparting a desired orientation to an article, such as in the precision alignment of a beam lead device or other small article.

The invention contemplates the provision of an article-supporting ram which is relatively movabe vertically within a vertical aperture in a horizontal plate. The aperture has a lower portion of dimensions very slightly larger than those of a beam lead device or other article, and is shaped such that the article will necessarily assume a desired orientation within the lower portion of the aperture. The aperture has an upper portion with walls tapered downwardly and inwardly in order to guide the article, when moving downwardly within the aperture, into an aligned position in the lower portion of the aperture.

A partial vacuum may be applied through a passageway in the ram to remove the article from a transfer tool or from an initial adhesion to a carrier. A fluid is then introduced into the vicinity of the upper surface of the ram at approximately the same time as the ram begins a relative downward movement within the aperture. The fluid tends to cause the article to float, while interfering with any inclination of the article to adhere to the tapered walls of the aperture due to friction, static electricity and/or the presence of any residual adhesive material on the article. The fluid also tends to form a meniscus sloping downwardly away from the tapered walls toward the desired orientation of the article, thereby further urging the article into the desired orientation. Once the article is aligned correctly on the upper surface of the ram, the partial vacuum may again be introduced beneath the article so as to withdraw the fluid and to retain the article on the ram, after which the ram may be raised for removal of the article. The beam lead device or other article may be transferred, for example, onto a compliant tape for subsequent bonding to a substrate, or directly to suitable bonding apparatus.

DETAILED DESCRIPTION

Figures 1, 2, 3:
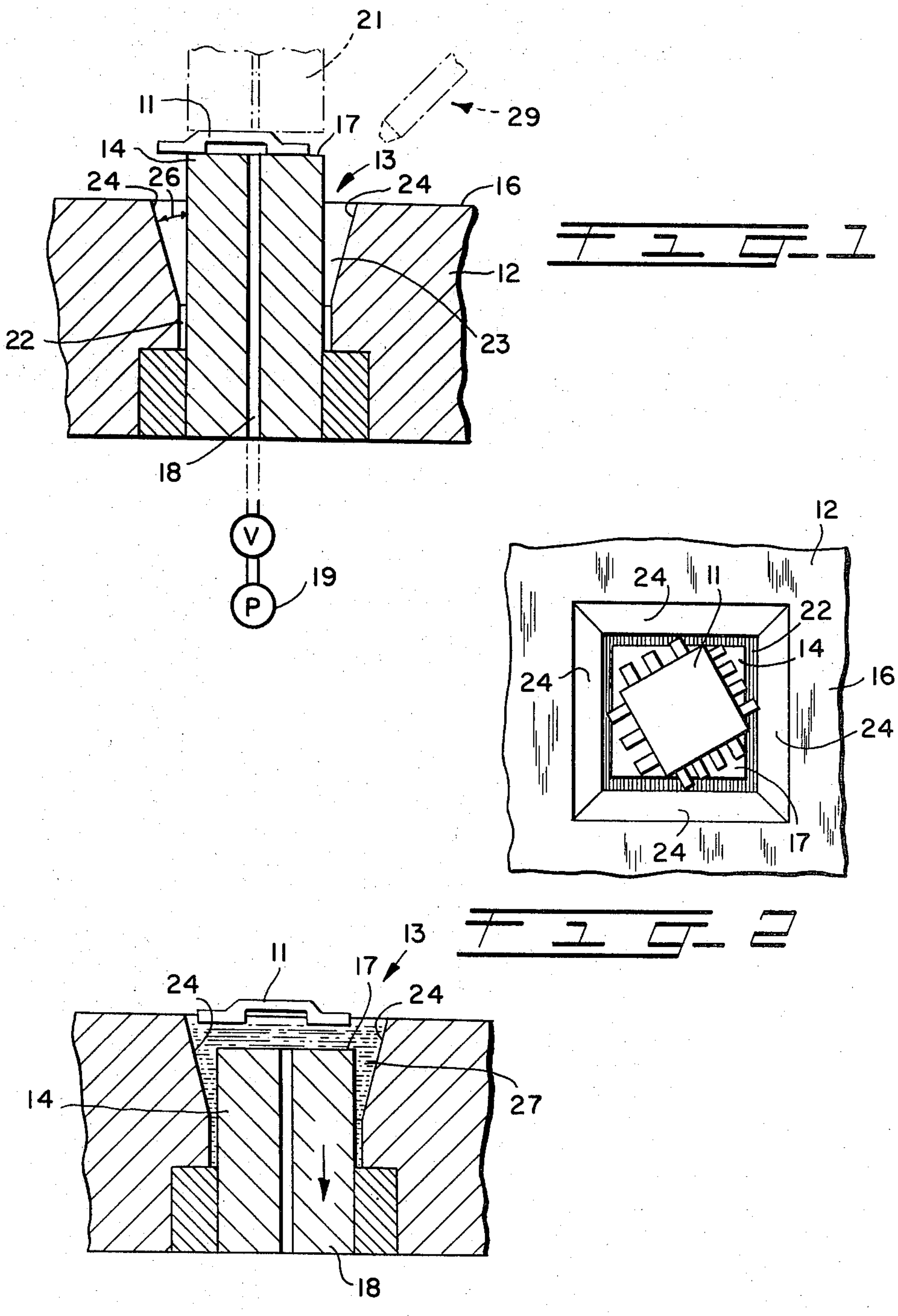
FIGS. 1, 3, 4 and 5 of the drawing are front elevation cross-sectional views illustrating successive stages in the operation of apparatus for imparting a desired orientation to an article in accordance with the principles of the invention.
FIGS. 2 and 6 are plan views of the structure, corresponding generally to FIGS. 1 and 5, respectively, further illustrating the operation of the apparatus.

Referring initially to FIGS. 1 and 2 of the drawing, an article 11, e.g., a beam lead device, has a random orientation in a generally horizontal plane. It is desired that the article be aligned precisely in a particular orientation, such as that illustrated in FIGS. 5 and 6.

Apparatus for performing the required alignment task includes a horizontal plate 12 with a vertical aperture 13. A ram 14 extends upwardly within the aperture 13. The ram 14 is shown as having a square cross section, but may, alternatively, be rectangular, round, or of any other appropriate shape. The ram is vertically movable relative to the horizontal plate 12 and may project above a flat top surface 16 of the plate, as shown in FIG. 1. In this position of the ram 14, the article 11 may be placed in random fashion on a flat upper surface 17 of the ram. A vertical passageway 18 through the ram may connect the ram upper surface 17 selectively, through a valve V, with a source 19 of partial vacuum, such that a pressure differential across the article adheres the article temporarily to the ram upper surface in the random disposition of the article. The source 19 may, for example, be employed to remove the article 11 from a transfer tool 21, e.g., a vacuum-applying needle, or a carrier to which the article may initially be loosely attached in random orientation by any suitable adhesive, e.g., Biwax resin, manufactured by the Biwax Corporation.

Figure 4:
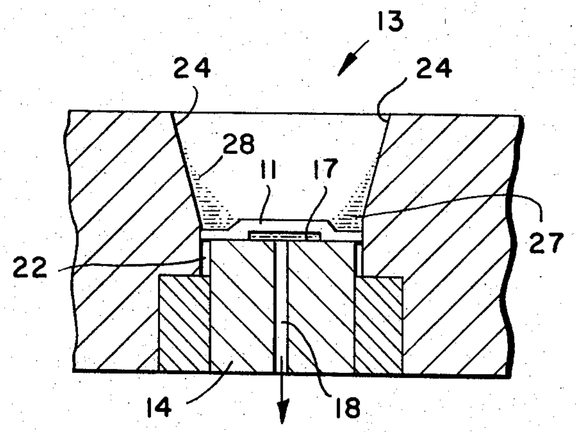
Figures 5, 6:
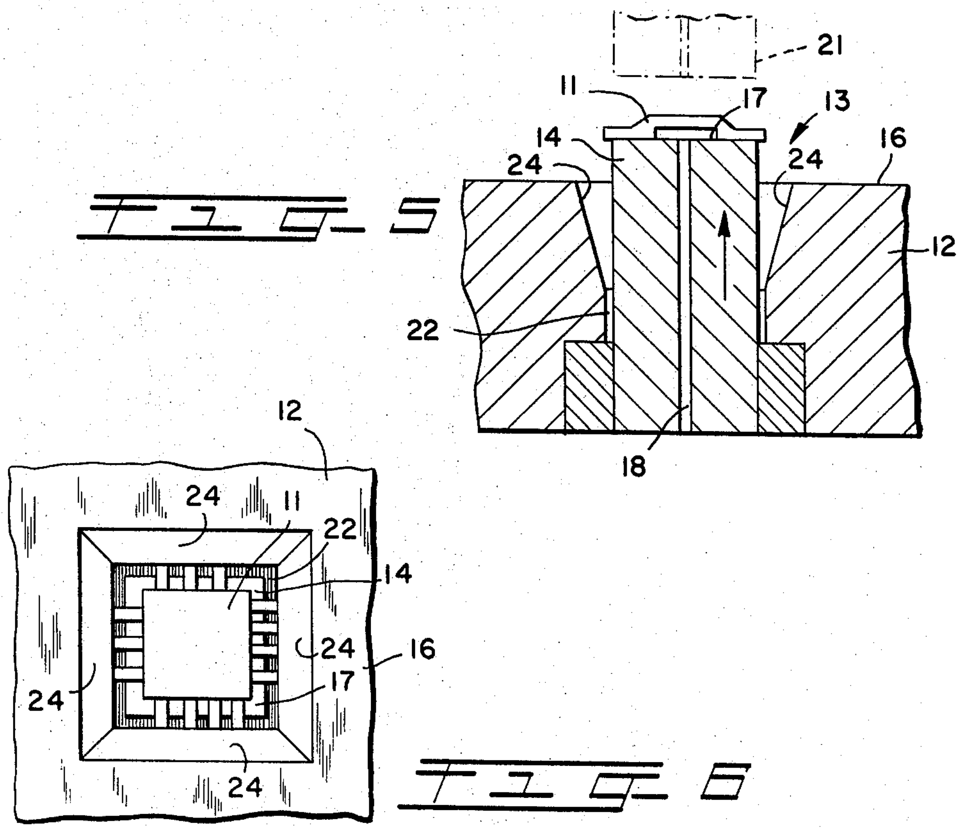

The upper surface 17 of the ram 14 has dimensions which are slightly smaller than those of the article 11, such that the article will overextend the periphery of the ram when properly aligned, as shown in FIGS. 5 and 6. A lower portion 22 of the aperture 13 has dimensions which are very slightly larger than those of the article 11, and is shaped such that the article will necessarily be correctly aligned in the desired orientation when positioned within the lower portion of the aperture upon the flat upper surface 17 of the ram, as shown in FIG. 4. The shape of the article and, thus, of the lower portion of the aperture is illustrated, by way of example only, as square in the drawing. Other shapes are also quite possible, e.g., rectangular, hexagonal, etc.

An upper portion 23 (FIG. 1) of the aperture 13, which extends between the top surface 16 of the plate 12 and the lower portion 22 of the aperture, is bounded by a number of tapered aperture walls 24,24, . . . The walls 24,24, . . . slope downwardly and inwardly toward the lower portion 22 for the purpose of guiding the article into the desired orientation position within the lower portion, a relatively small taper angle 26 with respect to the vertical being preferred, e.g., approximately 10°. Thus, movement of the article-supporting ram 14 downwardly relative to the aperture 13 will tend to effect alignment of the article 11 into the desired orientation position.

It is not at all certain, however, that proper article alignment would occur in every instance, insofar as the apparatus has been described to this point. The article might tend to adhere to the tapered, article-guiding walls 24,24, . . . due to the influence of such factors as friction, which may be enhanced by the presence of tool marks or other surface imperfections, static electricity and/or the presence of any residual adhesive on the artcle. Accordingly, some mechanism for enhancing the aligning effect of the structure, so as to overcome, the wall-adhering tendency of the article, is appropriate.

It has been discovered that the aligning effect of the structure, as described thus far, may be emhanced greatly by the provision of facilities for introducing a fluid 27 (FIG. 3) into the vicinity of the upper surface 17 of the ram 14. The fluid 27 will act as a buoyant and/or lubricating film beneath the article 11, floating the article and/or otherwise facilitating alignment by overcoming the inclination toward wall adherence. Moreover, the fluid 27 preferably takes the form of at least one droplet of a non-contaminating liquid, such as trichloroethylene or methyl alcohol, having such surface tension characteristics as to form within the aperture 13 a meniscus 28 (FIG.4), which may advantageously slope downwardly away from the tapered walls 24,24, . . . of the aperture in correspondence with the wall pattern and, thus, in accordance with the desired orientation of the article 11. The slope of the meniscus 28 will serve as a further guidance mechanism in urging the article toward its desired orientation, particularly in the normal case of the article actually floating on the surface of the fluid. The fluid 27 is also preferably selected to cleanse the article of any residual adhesive, e.g., heated trichloroethylene in the case where residual Biwax resin may be present. Adhesive resin removal not only will decrease the wall-adhering tendency of the article 11, but also will facilitate any subsequent encapsulation operations. The fluid may be introduced into the vicinity of the ram upper surface 17 in any expedient manner, e.g., through the use of a fluid injection needle 29.

In the operation of the apparatus previously described and in carrying out the method of the invention, the article 11 is first placed upon the upper surface 17 of the ram 14 with the ram in the raised position of FIG. 1 so as to facilitate the placement. This article placement step may involve the application of a partial vacuum from the source 19 to the ram upper surface in order to remove the article from a transfer tool 21 or from a temporary carrier, Biwax resin or any other suitable adhesive preferably initially attaching the article to the carrier. The partial vacuum will also serve to adhere the article temporarily to the ram upper surface.

Next, with the vertical passageway 18 through the ram 14 decoupled from the source of partial vacuum, the ram is lowered relative to the tapered aperture walls 24,24. . . FIG.3), and the fluid 27 is introduced into the vicinity of the upper surface 17 of the ram, e.g., from the needle 29 (FIG. 1). The fluid 27 is preferably trichloroethylene, and may be heated to about 188°F with the associated alignment apparatus heated to about 120°F, where it may be advantageous to cleanse the article 11 of any residual Biwax resin. Surface tension effects in the fluid 27 will ordinarily be sufficient to avoid the loss of any significant amount of fluid through the narrow gap beneath the lower portion 22 of the aperture 13, between the ram 14 and an adjacent bearing surface within the horizontal plate 12, without the provision of any special sealing arrangement.

The effect of the fluid 27 is not only to tend to cause floatation of the article and to interfere with any inclination of the article, due to friction, static electricity and/or residual Biwax resin or other adhesive, to adhere to the tapered walls 24,24, . . . of the aperture 13, but also to form the meniscus 28. As has been suggested previously, the article tends toward the desired orientation due to the downward slope of the meniscus from the tapered walls 24,24, . . . toward the center of the aperture. Thus, as the ram moves downwardly into the position of FIG. 4, the downward force of gravity and inward forces from the aperture walls 24,24, . . . and the meniscus 28 cause the floating article to be aligned into its desired orientation within the lower portion 22 of the aperture.

With the article 11 appropriately aligned on the upper surface 17 of the ram 14, partial vacuum may again be introduced into the vicinity of the ram upper surface from the source 19 (FIG. 1) through the vertical passageway 18. The fluid 27 is withdrawn by the effect of the partial vacuum, after which a pressure differential across the article retains the article in its aligned condition upon the ram upper surface.

The ram 14 may now be raised, with continued application of partial vacuum through the vertical passageway 18, to the uppermost position of the ram (FIGS. 5 and 6), in order to facilitate removal of the article from the apparatus. The aligned article may be released for transfer back to the transfer tool 21 by termination of the partial vacuum application, after which the transfer tool may be employed in attaching the beam lead device or other article 11 in its aligned position to a substrate or to an intermediate carrier such as a compliant tape.

It is to be understood that the described methods and apparatus are simply illustrative of certain embodiments of the invention. It should be quite clear that additional embodiments might involve the simultaneous alignment of any number of articles in parallel, utilizing plural rams in plural apertures of a single horizontal plate or plural horizontal plates. Embodiments wherein buoyant forces aid in alignment, but are insufficient to float the article, are also quite possible. Also envisioned are embodiments wherein the meniscus slopes upwardly, rather than downwardly, from the tapered aperture walls toward the desired orientation of the article, floatation and lubrication effects being sufficient to provide proper alignment of the article. Many other modifications may be made in accordance with the principles of the invention.

What is claimed is:

1. A method of imparting a desired orientation to an article, comprising the steps of:

placing the article upon an upper surface of a ram which extends upwardly within structure defining a vertically extending aperture bounded by walls tapered downwardly and inwardly substantially in accordance with the desired orientation of the article, then lowering the ram relative to the tapered aperture walls, and introducing a fluid into the vicinity of the upper surface of the ram so as to facilitate guidance of the article into the desired orientation in accordance with the taper of the aperture walls.

2. In the method of claim 1, said fluid introducing step comprising:

introducing into the vicinity of the upper surface of the ram a droplet of a liquid capable of floating the article on a top surface of the liquid.

3. In the method of claim 1, said fluid introducing step comprising:

introducing into the vicinity of the upper surface of the ram at least one droplet of a liquid having such surface tension characteristics as to form within the aperture a meniscus sloping downwardly away from the tapered walls of the aperture in accordance with the desired orientation of the article.

4. In the method of claim 1, said article placing step comprising:

introducing a partial vacuum into the vicinity of the upper surface of the ram, while positioning the article and the upper surface of the ram in proximity to one another such that a pressure differential across the article causes the article to adhere to the upper surface of the ram, and thereafter releasing the partial vacuum with the ram so disposed that the article is supported by the upper surface of the ram.

5. In the method of claim 1, said article placing step comprising:

introducing a partial vacuum into the vicinity of the upper surface of the ram; while positioning a carrier, to which the article is releasably attached, and the upper surface of the ram in proximity to one another such that a pressure differential across the article causes the article to detach from the carrier and to adhere to the upper surface of the ram; and thereafter releasing the partial vacuum with the ram so disposed that the article is supported by the upper surface of the ram.

6. In the method of claim 5, the article being initially releasably attached to the carrier by an adhesive, said fluid introducing step comprising:

introducing into the vicinity of the upper surface of the ram a cleansing agent for the adhesive.

7. In the method of claim 1, the subsequent step of:

introducing a partial vacuum into the vicinity of the upper surface of the ram beneath the article so as both to withdraw the fluid from the vicinity of the upper surface of the ram and to adhere the article to the upper surface of the ram in the desired orientation of the article.

8. In the method of claim 7, the further step of thereafter:

raising the ram relative to the tapered aperture walls so as to position the article at a height at least substantially level with the top of the aperture, and then releasing the partial vacuum to facilitate removal of the article from the upper surface of the ram.

9. In the method of claim 7, said article placing step comprising:

introducing a partial vacuum into the vicinity of the upper surface of the ram, while positioning the article and the upper surface of the ram in proximity to one another such that a pressure differential across the article causes the article to adhere to the upper surface of the ram, and thereafter releasing the partial vacuum with the ram so disposed that the article is supported by the upper surface of the ram.

10. In the method of claim 7, said article placing step comprising:

introducing a partial vacuum into the vicinity of the upper surface of the ram; while positioning a carrier, to which the article is releasably attached, and the upper surface of the ram in proximity to one another such that a pressure differential across the article causes the article to detach from the carrier and to adhere to the upper surface of the ram; and thereafter releasing the partial vacuum with the ram so disposed that the article is supported by the upper surface of the ram.

11. In the method of claim 10, the article being initially releasably attached to the carrier by an adhesive, said fluid introducing step comprising:

introducing into the vicinity of the upper surface of the ram a cleansing agent for the adhesive.

12. In the methof of claim 7, said fluid introducing step comprising:

introducing into the vicinity of the upper surface of the ram a droplet of a liquid capable of floating the article on a top surface of the liquid.

13. In the method of claim 7, said fluid introducing step comprising:

introducing into the vicinity of the upper surface of the ram at least one droplet of a liquid having such surface tension characteristics as to form within the aperture a meniscus sloping downwardly away from the tapered walls of the aperture in accordance with the desired orientation of the article.

14. Apparatus for imparting a desired orientation to an article, comprising:

means, including structure defining a vertically extending aperture bounded by article-guiding walls, for guiding the article in accordance with said desired orientation as the article moves downwardly relative to the article-guiding walls;

means, vertically movable relative to the article-guiding walls and including a supporting surface, for supporting the article within the aperture on said supporting surface;

means for moving the article-supporting means downwardly relative to the article-guiding walls; and means for introducing a fluid into the vicinity of the supporting surface of the article-supporting means during movement of the article-supporting means downward relative to the article-guiding walls so as to facilitate guidance of the article into the desired orientation.

15. In the apparatus of claim 14, said fluid introducing means comprising:

means for introducing into the vicinity of the supporting surface of the article-supporting means at least one droplet of a liquid capable of floating the article on a top surface of the liquid.

16. In the apparatus of claim 14, said fluid introducing means, comprising:

means for introducing into the vicinity of the supporting surface of the article-supporting means at least one droplet of a liquid having such surface tension characteristics as to form within the aperture a meniscus sloping downwardly away from the article-guiding walls in accordance with the desired orientation of the article.

17. In the apparatus of claim 14:

the article-guiding walls bounding the vertically extending aperture of said article-guiding means being tapered downwardly and inwardly substantially in accordance with the desired orientation of the article.

18. In the apparatus of claim 14:

said article-supporting means including a passageway communicating with the supporting surface of the article supporting means; and means, selectively communicable with said passageway, for applying a partial vacuum to the passageway so as both to withdraw said fluid from the vicinity of the supporting surface subsequent to orientation of the article and to adhere the article to the supporting surface.

* * * * *

Dedication 3,776,394.—*Dennis Brian Miller*, Ewing Township, Mercer County, N.J. METHODS AND APPARATUS FOR IMPARTING A DESIRED ORIENTATION TO AN ARTICLE. Patent dated Dec. 4, 1973. Dedication filed Nov. 10, 1975, by the assignee, *Western Electric Company, Incorporated.*

Hereby dedicates to the Public the entire remaining term of said patent.

[*Official Gazette February 10, 1976.*]